July 10, 1962 C. CAPRIN ET AL 3,043,450
EXPENDABLE PALLET
Filed Nov. 25, 1959 2 Sheets-Sheet 1
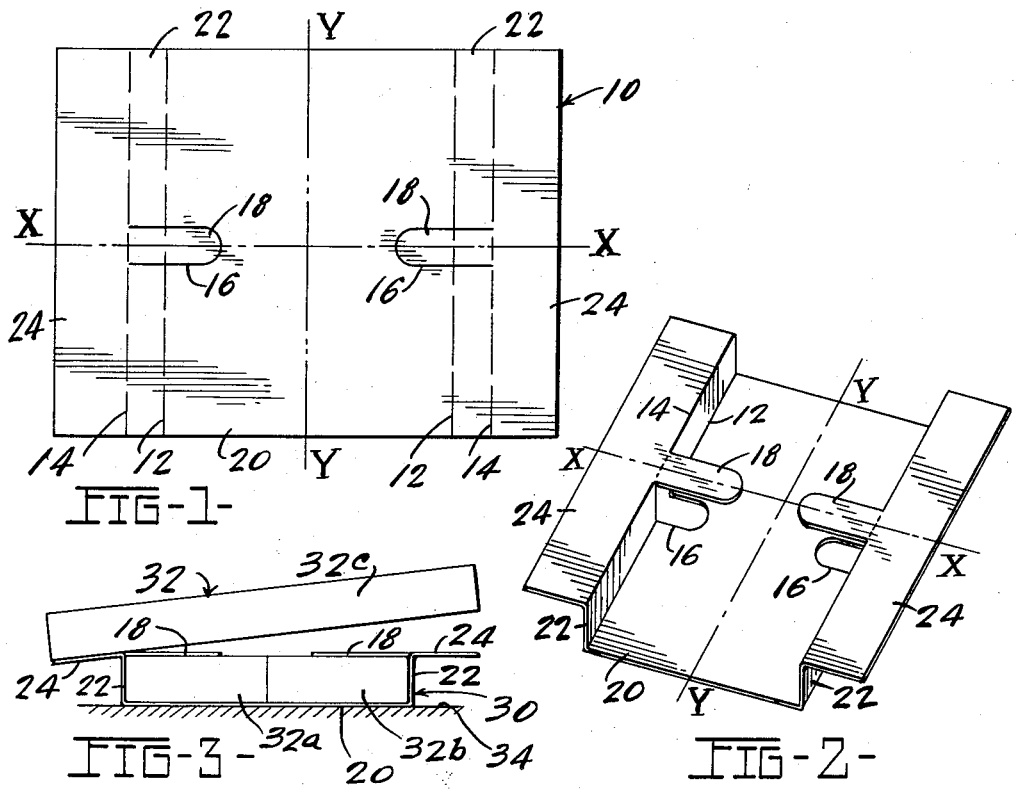
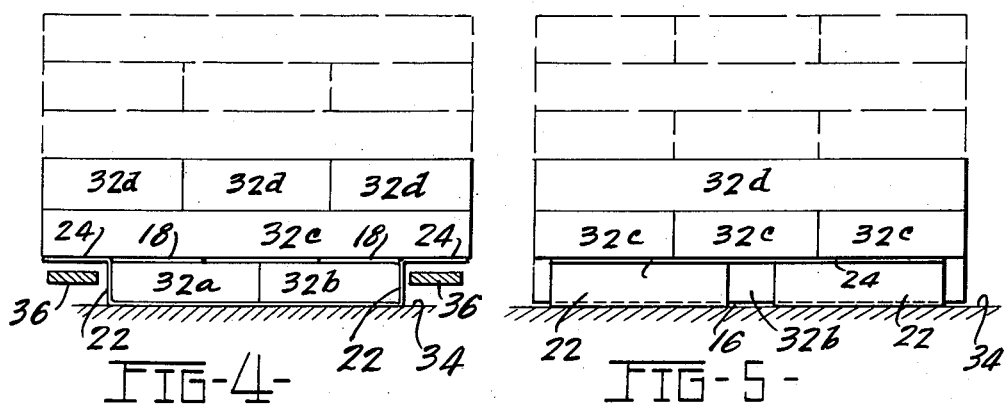
INVENTORS:
CONRAD CAPRIN,
JOHN L. WYCKOFF,
BY LESLIE R. COE.
ATTYS.

July 10, 1962 C. CAPRIN ET AL 3,043,450
EXPENDABLE PALLET
Filed Nov. 25, 1959 2 Sheets-Sheet 2
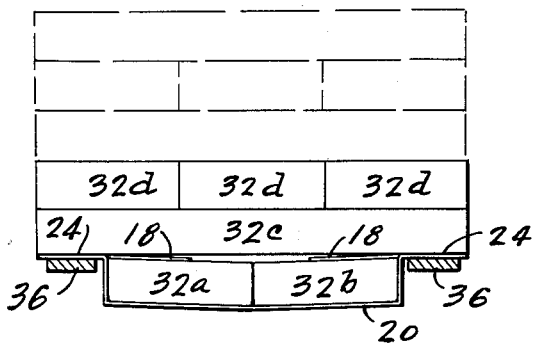
FIG-6-
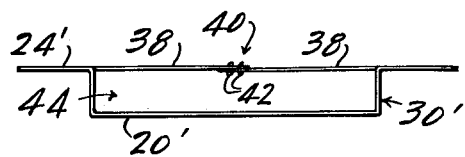
FIG-7-
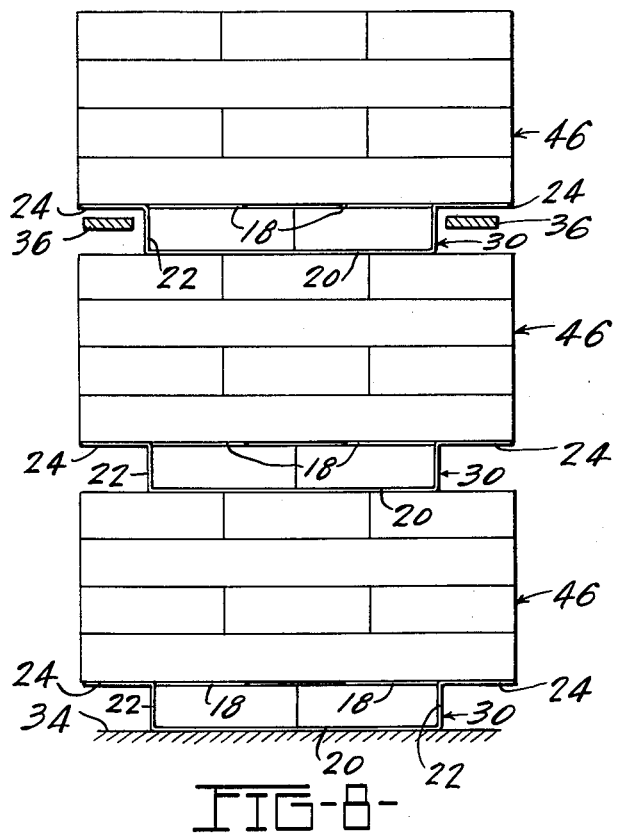
FIG-8-
INVENTORS:
CONRAD CAPRIN.
JOHN L. WYCKOFF.
BY LESLIE R. COE.
ATTYS.

3,043,450
EXPENDABLE PALLET
Conrad Caprin, Sunnyvale, and John L. Wyckoff and Leslie R. Coe, San Jose, Calif., assignors to Owens-Corning Fiberglas Corporation, a corporation of Delaware
Filed Nov. 25, 1959, Ser. No. 855,407
4 Claims. (Cl. 214—10.5)

This invention relates to pallets for handling material for transport, and more particularly to expendable pallets for ultimate disposal as a waste product after an intended use.

Many kinds of pallets ranging from costly, heavily built platform type units to inexpensively made light weight styles may be found in the art; the different types being adapted for a wide variety of material handling requirements including the shipment of stacks, bundles or packages of goods or materials to be shipped and so arranged on a pallet as to permit the lifting and transporting thereof by means of a "fork" lift truck or similar device common to the field of shipping.

It is the object of this invention to produce an efficient, simple, effective, economic and expendable pallet for the transportation of goods.

It is another object to produce an expendable pallet from a single sheet of stock.

It is another object to produce a pallet which may be shaped to conform at least in part with a portion of the goods to be transported in order to economize on the storage space required for the goods.

Another object is a pallet that fastens to the load to hold the loaded pallet in load carrying position.

It is another object to produce a pallet that when not loaded may be stored or transported in flat knocked down condition.

To this end the pallet is made from a prescored sheet of a semi-rigid cardboard, for example corrugated boxboard or the like, so that a relatively large number of pallets in blank form may be stacked conveniently in a pile, thus facilitating the shaping of the blanks into material material receiving arrangement to form a pallet for the reception of the goods to be transported.

The invention may comprise a sheet of cardboard or similar material which if desired may be reinforced with fibers of jute, cellulose, mineral such as glass or other substances, and may be scored or treated in a manner to permit its being folded or shaped to present a central bottom panel having adjoining and upstanding side wall panels, wing panels or flaps extending outwardly away from the side wall panels, and inwardly extending tabs or tongue elements in alignment with the wing panels adapted to be frictionally engaged by portions of the load to form a pallet held in a predetermined position thereby, the tabs preferably being formed integrally with the sheet.

The invention also may comprise other materials or combinations thereof and may be provided with flap elements or tabs adapted to be stapled or otherwise fastened together, the side wall panels and wing elements associated therewith being held in their desired load engaging positions independently prior to being loaded to their pallet form.

The above mentioned and other features and objects of this invention and the manner of attaining them will become more apparent and the invention will be best understood by reference to the following description of an embodiment of the invention in conjunction with the accompanying drawings, wherein:

FIGURE 1 is a plan view of a scored sheet of material from which a pallet may be formed;

FIGURE 2 is an isometric view of the sheet as it appears in pallet forming position;

FIGURE 3 is a side elevational view of the pallet showing one step in the placement of a part of the load thereon;

FIGURES 4 and 5 are side elevational views of the loaded pallet;

FIGURE 6 is an elevational view of the loaded pallet as it might appear when carried on the forks of a "fork" lift truck;

FIGURE 7 is an elevational view of a modified form of the invention; and

FIGURE 8 is a diagrammatic view illustrating the compact arrangement resulting from superimposing a plurality of loaded pallets comprising this invention.

Referring now to FIGURES 1 and 2, there may be provided a generally rectangular sheet or blank 10 having a transverse axis X—X, and an oppositely extending axis Y—Y. Arranged laterally and at predetermined distances from the axis Y—Y, there may be placed fold or score lines 12, 12 and 14, 14, their particular placement being determined basically by the size and shape of the parts or packages to be transported and comprising the load. Slitted lines 16, 16 may be provided in the blank 10 along or near the axis X—X to form tongue shaped tabs 18, 18. These tabs may be made of varying lengths according to the needs or character of the load to be carried. As may be noted in FIGURE 2 the fold lines 12, 12, 14, 14 may define a base or seat portion 20, upstanding side wall portions 22, 22, and outwardly extending wing portions 24, 24; the tabs 18, 18 being extended inwardly from and in substantially the same plane as the wings 24, 24. The above enumerated parts may cooperate to provide a folded arrangement or form such as a primary unit 30, and as such may be adapted to receive packages of goods 32 and thereby constitute a palleted unit ready to be transported in the usual well known manner.

In order to prepare a pallet for shipment or for storage in a warehouse, a blank 10, in the form of a folded unit 30 may be placed on a suitable support 34, see FIGURE 3, and one or more packages 32a, 32b may be placed on the base portion 20 of the blank in a direction generally parallel with and along the axis Y—Y, and within the side wall panels 22, 22 of the pallet; the tabs 18 being positioned to overlie the packages 32a, 32b as shown. Succeeding layers of packages 32c then may be added in a transverse direction parallel to the axis line X—X, the tabs 18 being confined frictionally within the stack of packages to maintain the side wall panels 22, 22 snugly against the sides of the lowermost packages 32a, 32b, while at the same time maintaining the wings 24, 24 in their upward and outward position with respect to the said lowermost packages. Thus provision is made for the passage of a pair of arms 36 of a "fork" lift truck to extend along and beneath the wings 24, 24 of the pallet, and the overhanging ends of the packages 32c, at the same time utilizing the space within the sidewall panels 22, 22 between the arms of the fork for carrying the packages 32a, 32b, thus increasing the efficiency of both the storage capacity and the shipping facilities of the system. Additional packages 32d may be added if desired and may be placed in alternating, opposed directions to assist in stabilizing the load.

As the lift truck is actuated to raise the load, the arms 36 may engage the wings 24, 24 of the pallet, and the weight of the superimposed packages 32c, 32d may act to exert sufficient downward force to frictionally hold the wings 24 on the arms 36 and thereby provide a support for the packages 32a, 32b on the base or seat portion 20 of the pallet, as it becomes suspended between the arms 36 during the lifting movements thereof.

A modified form of the invention, see FIGURE 7, may comprise tabs 38, 38 of sufficient length to permit a slight overlapping of the ends of the tabs at the region 40 located centrally of a pallet 30'. Staples 42, 42 may be applied to secure the ends of the tabs to each other and to maintain the body 44 of the pallet in a generally rectangular form. Packages of material to be transported (not shown) may be placed in the body portion 44 preferably before the tabs are stapled together, to form a generally solid bottom for the palleted goods and to insure that the walls 22, 22 and wings 24, 24 will be held in predetermined position independently and prior to frictional contact of the tabs with the superimposed packages of material.

In FIGURE 8 there is shown a plurality of palletized units 46 superimposed on each other to indicate the advantage gained in the utilization of the normally open space between the arms 36 of a lift truck (not shown). When ordinary platform pallets of metal or wood are used the bottom layer of goods necessarily must be placed on top of the platform of the pallet. The unused spaces usually existing beneath the platform surfaces of such pallets thus is wasted.

The proper selection of materials to be used in the manufacture of pallets such as disclosed herein may depend on and vary with the types of goods to be transported, or with climatic conditions encountered, as well as with the size, weight or density of the goods to be transported. In the present instance a typical application may be related to the shipment of fibrous asphaltic roofing shingles. Ordinarily these shingles are shipped in packages of approximately 36 inches length, 12 inches width, and 3 to 4 inches height; each package ordinarily comprising a standardized quantity of asphaltic paper shingles, the packages being arranged in a pattern to form a plan area of approximately 36 inches square. Thus a pallet for carrying such a load may also be approximately 36 inches square in projected area, and a semi-rigid paper stock of approximately 36 inches by 42 to 44 inches may be used to form a blank from which such a pallet may be formed.

The paper stock may be reinforced with glass fibers, jute or other reinforcing materials, and it may also be treated on one side or on both sides or impregnated with water resistant materials to impart more than average wet strength to the paper and to assist in resisting unusual weathering or handling conditions. Thus a pallet suitable for the purposes indicated may be inexpensively manufactured, and thereby be expendable; in addition the pallet may be reclaimed if desired by using care in unpacking, and unfolding the pallet to the original flat blank condition to permit stacking in a pile and return in blank form to the shipper or elsewhere for reuse.

Among the many types of goods which may be transported by the use of the present invention there may be crates, bundles, boxes, or other units of stackable goods, including siding, prefab products, food items, cartons for clothing, and so forth; the example of asphaltic shingles described above being a widely known product which is produced in easily stackable packages.

While there is described above the principles of this invention in connection with specific apparatus, it is to be clearly understood that this description is made only by way of example and not as a limitation to the scope of the invention.

We claim:
1. A blank to be formed into a pallet for use with a fork lift truck in transporting stacked packages comprising: a sheet of semi-rigid plano-laminar material having a plurality of parallel spaced apart fold lines at predetermined locations therein, said fold lines defining respectively a central bottom web portion for the pallet; sidewall portions adjoining said bottom portion; continuously extending wing portions adjoining said sidewall portions to form lifting areas for said truck; and oppositely positioned tabs formed from said bottom web and sidewall portions adapted to be displaceable from said sheet and extending inwardly from at least one edge of said sidewall portions, whereby said packages cooperate with said tabs to maintain said wings in fork engaging position.

2. A blank according to claim 1 wherein said tabs are of sufficient length to permit their being joined at the central region of the pallet.

3. A pallet formed of substantially plano-laminar material adapted for transporting a plurality of stackable units by forks of lift trucks comprising: a web element adapted to form a bottom portion for the pallet and side walls extending upwardly from opposite edges of said bottom portion, said side walls being adapted to embrace at least a first layer of stackable units to be transported between said side walls on said pallet, continuous flaps extending freely from said side walls reaching outwardly away from the central region of said bottom portion and adapted to form lifting areas for said truck forks, and tabs extending inwardly from said side walls each opposite and in continuity with one of said flaps and spaced from said bottom portion to overlie at least said first layer of said units, said tabs each extending from its respective side wall in a location intermediate the ends of its associated oppositely extending flap and adapted to being held in said relation by the weight of other units superimposed above said tabs whereby said units cooperate with said tabs to maintain said flaps in fork engaging position.

4. A pallet formed of substantially plano-laminar material adapted for transporting a plurality of stackable units by forks of lift trucks comprising: a web element adapted to form a bottom portion for the pallet and side walls extending upwardly from opposite edges of said bottom portion, said side walls being adapted to embrace at least a first layer of stackable units to be transported between said side walls on said pallet, continuous flaps extending freely from said side walls reaching outwardly away from the central region of said bottom portion and adapted to form lifting areas for said truck forks, and tabs extending inwardly from said side walls each opposite one of said flaps and spaced from said bottom portion to overlie at least said first layer of said units, said tabs each extending from its respective side wall in a location intermediate the ends of its associated oppositely extending flap and adapted to being held in said relation by the weight of other units superimposed above said tabs, said tabs also being of sufficient length to permit their being overlapped at the central region of the pallet whereby said units cooperate with said tabs to maintain said flaps in fork engaging position.

References Cited in the file of this patent

UNITED STATES PATENTS

| | | |
|---|---|---|
| 1,679,721 | Howard | Aug. 7, 1928 |
| 2,489,054 | Sprolle | Nov. 22, 1949 |
| 2,671,584 | Taylor | Mar. 9, 1954 |
| 2,678,770 | Bonini | May 18, 1954 |
| 2,896,798 | Celley | July 28, 1959 |